United States Patent [19]

McBurney et al.

[11] Patent Number: 4,839,064

[45] Date of Patent: * Jun. 13, 1989

[54] METHOD AND APPARATUS FOR CLEANING COOLING TOWER BASINS

[76] Inventors: Kevin B. McBurney, 1470 Ashbrook Dr., Lawrenceville, Ga. 30245; Javier Aleman, 2171 Whitebluff Way, Buford, Ga. 30518

[*] Notice: The portion of the term of this patent subsequent to Jul. 28, 2004 has been disclaimed.

[21] Appl. No.: 78,110

[22] Filed: Jul. 27, 1987

Related U.S. Application Data

[63] Continuation-in-part of Ser. No. 771,276, Aug. 30, 1985, Pat. No. 4,683,067.

[51] Int. Cl.⁴ .................. B01D 35/16; B01D 35/28; B01D 36/04
[52] U.S. Cl. .................. 210/806; 210/767; 210/167; 210/258; 210/416.1; 15/1.7; 134/21
[58] Field of Search .............. 210/767, 806, 167, 241, 210/258, 299, 300, 302, 307, 310, 311, 316, 416.1, 188; 261/DIG. 11; 15/1.7; 134/21, 22.1; 137/123, 125, 140, 142, 147

[56] References Cited

U.S. PATENT DOCUMENTS

| | | | |
|---|---|---|---|
| 2,363,313 | 11/1944 | Gavin | 137/147 |
| 3,168,896 | 2/1965 | Berg | 15/1.7 |
| 3,347,586 | 10/1967 | Sharp | 137/140 |
| 3,734,853 | 5/1973 | Horvath | 15/1.7 |
| 4,036,756 | 7/1977 | Dockery | 137/142 |
| 4,362,628 | 12/1982 | Kennedy et al. | 210/167 |
| 4,389,351 | 6/1983 | O'Brien | 210/534 |
| 4,594,153 | 6/1986 | Weis | 210/258 |
| 4,683,067 | 7/1987 | Aleman et al. | 210/767 |

OTHER PUBLICATIONS

*Chemical Engineers' Handbook*, 5th ed., Perry and Chilton (ed.), McGraw-Hill, Inc., 1973, pp. 6-5-6-9.

*Primary Examiner*—Richard V. Fisher
*Assistant Examiner*—Linda S. Evans
*Attorney, Agent, or Firm*—James B. Middleton

[57] ABSTRACT

A method and apparatus for cleaning cooling tower basins. The apparatus includes a cleaning tool carrying a nozzle for picking up sludge within the basin, and a siphon for providing continuous suction on the cleaning tool. The pipe making up the siphon is formed into a trap to prevent entry of air into the system on temporary cessation of siphon action. The down side of the siphon may empty into a receiving tank; and, a pump can remove material from the receiving tank and lower the pressure to enhance operation of the siphon. With such enhancement, the siphon can lift material from a basin and discharge the material on a level above the level of the water in the basin. The nozzle has openings in all faces to suck in adjacent water and pick up contaminants suspended in the water adjacent to the nozzle.

8 Claims, 2 Drawing Sheets

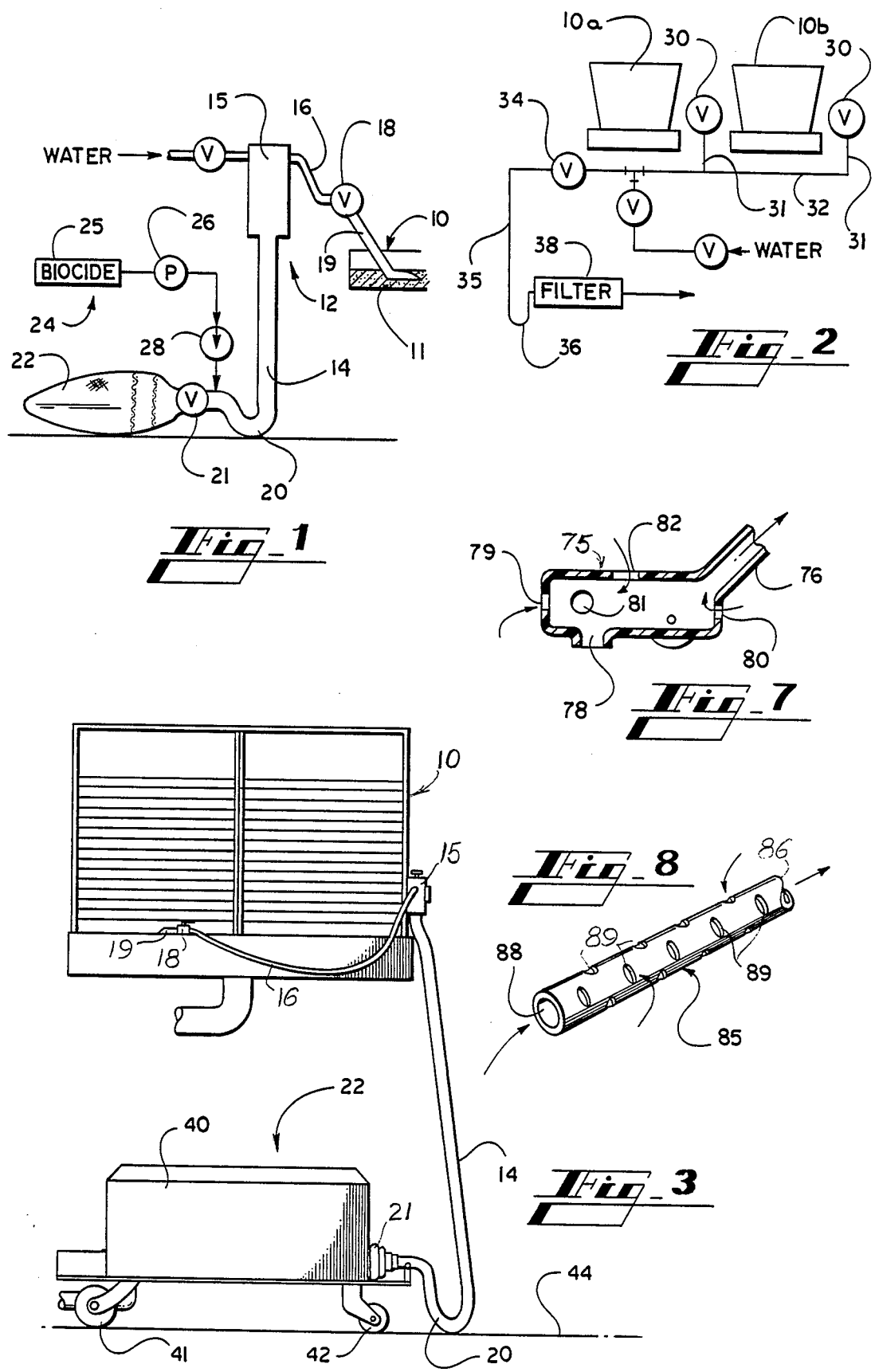

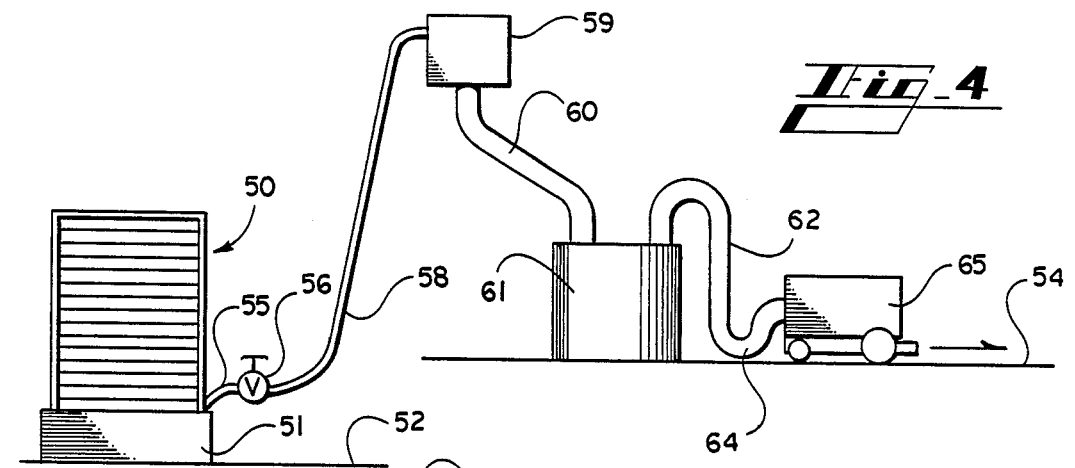
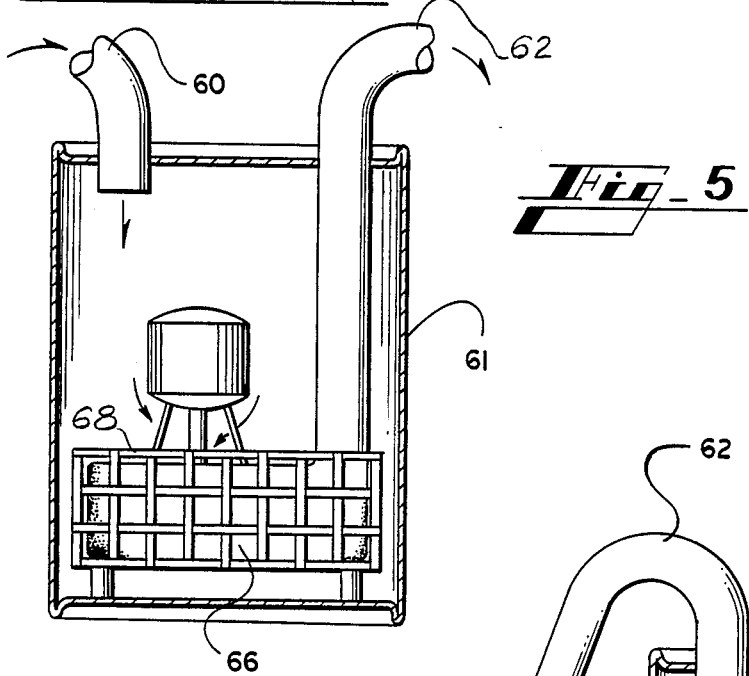
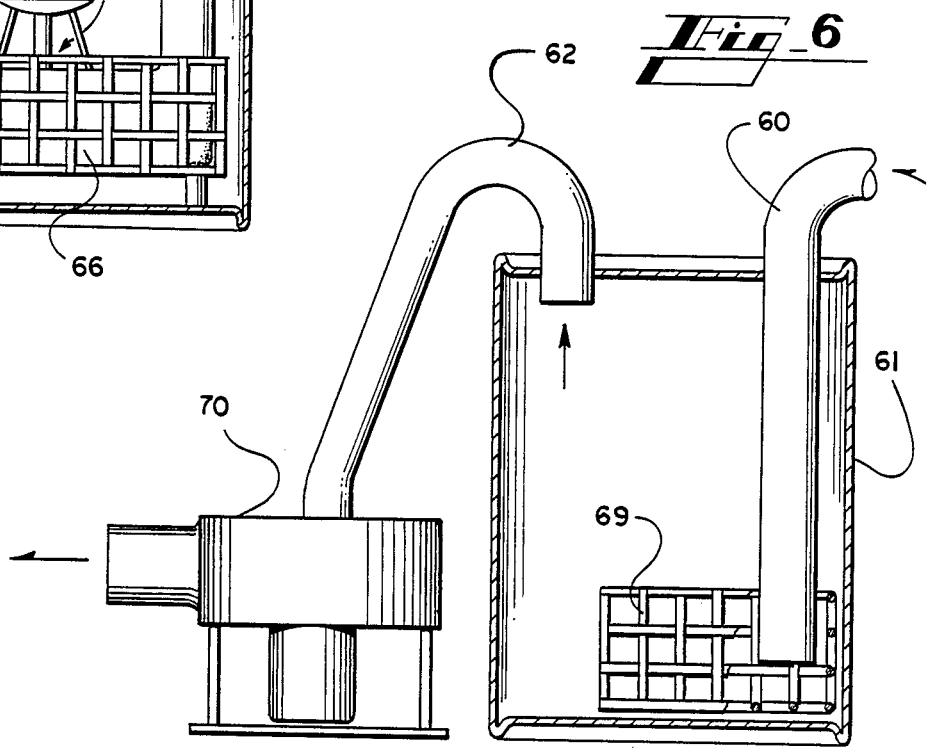

METHOD AND APPARATUS FOR CLEANING COOLING TOWER BASINS

CROSS REFERENCE TO RELATED APPLICATIONS

This application is a continuation-in-part of the co-pending application of the same inventors, filed Aug. 30, 1985, under Ser. No. 771,276, and titled "Method and Apparatus for Cleaning Tower Basins", now U.S. Pat. No. 4,683,067, issued July 28, 1987.

INFORMATION DISCLOSURE STATEMENT

In refrigeration and other cooling equipment, it is common to utilize a cooling tower, wherein water is used as a heat exchange fluid to circulate through the cooling equipment, then to convey the heat to the cooling tower where heat is removed. In these cooling towers, there is conventionally a basin from which water is removed to flow to the cooling equipment, the water coming from the cooling equipment and being sprayed into the top of the cooling tower. Atmospheric air normally passes through the cooling tower, either naturally or forced by fans, to cool the water as the water passes through the tower.

It will be understood that, in the conventional cooling tower, various sediments build up in the basin. These sediments of course include contaminants that naturally occur in the cooling water, and also include contaminants picked up in the cooling system, and in the pipes connecting the cooling tower with the cooling system. Additionally, it will be understood that contaminants from the tower itself tend to collect in the water.

An additional source of contaminants that appears to be overlooked by many of the cleaning systems is the atmosphere itself. Since a cooling tower is normally situated in the open air, and generally on the top of a building, it will be recognized that sand and other airborne materials will pass into the tower, and be carried into the tower basin. In an urban area, which is of course the area of greatest usage of cooling towers, the air tends to be rather highly contaminated so there is normally a relatively rapid buildup of sediment in the tower basin. Especially when there is construction in the vicinity, it will be recognized that there will be a very large amount of dust that may include sand, clay and soot, and various petroleum products and the like that will tend to bind these contaminants together.

The result of the above discussed contaminants is that the basin of a cooling tower will accumulate a large quantity of sludge in a relatively short time.

There have been some efforts at providing a cleaning system for cooling tower basins, but these have included such systems as shown in U.S. Pat. No. 4,362,628 to Kennedy et al. wherein a conventional pump is used to remove material from a tower basin, water being filtered and returned to the tower basin. Obviously, such a system could not handle the heavy and abrasive sludge that is actually found in a tower basin. U.S. Pat. Nos. 4,389,351 and 4,427,553 disclose perforated headers disposed within the tower basin, the object being simply to pump the material from the tower basin, with periodic backflush flow. Makeup water is added which both renews the water level and dilutes the remaining tower water. Again, these systems could not handle the sludge actually found in tower basins.

One of the conventional means for maintaining a cooling tower is referred to as a "bleed". This comprises means for sensing highly contaminated water, and means for draining a portion of the basin water. The conventional makeup water valve will then replace the drained water. It will therefore be understood that the highly contaminated water is diluted with fresh water, thereby reducing the total concentration of contaminants. Clearly, this system will not remove the sludge from the bottom of the tower basin.

The prior art means for truly cleaning the tower basin has involved shutting down the tower and draining the basin, and followed by the arduous task of manually shovelling the material from the tower basin. Such a procedure has numerous disavantages, including the fact that the entire cooling system must be shut down. Also, it will be understood that the tower basin is normally coated with an anti-corrosive material, and the scraping of shovels on the basin tends to scratch or remove the anti-corrosive coating. Also, in many instances it is virtually impossible to shut down the cooling system since it may be used for such critical things as medical facilities, computer facilities and the like.

It will be understood that a few tower basins may be so situated that the sludge and debris needs to be elevated for removal from the basin. Since a siphon typically requires that the net motion be down, the usual siphon, and the apparatus disclosed in the above identified co-pending application, would be unuseable for such towers.

SUMMARY OF THE INVENTION

This invention relates generally to a method and apparatus for cleaning cooling tower basins and the like, and is more particularly concerned with a highly efficient cleaning system, using a siphon for conveyance of the refuse, and which is further useable below grade.

The present invention provides a method for removing the sludge from the bottom of a tower basin wherein water flow is established, and suction is applied to the bottom of the basin to remove the sludge therefrom. The material removed is strained to allow the water to be passed into the conventional sewer system, while damaging sludge is retained in a filter means.

In one embodiment of the invention, a siphon action is established, and the siphon action is passed through a cleaning tool having a cleaning head disposed below the basin water level. Sludge from the basin is passed through the cleaning tool, into the siphon, and the sludge is collected in a filter means while water passes therethrough to be disposed of in conventional manner. It is contemplated that the present invention may be embodied in a single, portable tool for use with various cooling towers, or may be embodied in a permanent installation for cleaning a single tower, or a gang of towers.

In one embodiment of the invention, receiving means is provided, with pump means for removing refuse from the receiving means. The siphon supplies the receiving means; and, in this embodiment, the basin to be cleaned may be below grade from the discharge of the siphon.

BRIEF DESCRIPTION OF THE DRAWINGS

These and other features and advantages of the present invention will become apparent from consideration of the following specification when taken in conjunction with the accompanying drawings in which:

FIG. 1 is a somewhat schematic illustration showing a tower cleaning apparatus made in accordance with the present invention;

FIG. 2 is a schematic illustration showing a permanent installation for practicing the present invention;

FIG. 3 is a side elevational view showing apparatus made in accordance with the present invention in conjunction with a tower to be cleaned;

FIG. 4 is a view similar to FIG. 3 but showing a modified form of the invention for use when the tower basin is below grade;

FIG. 5 is an enlarged cross-sectional view showing one form of receiver for use in the arrangement of FIG. 4;

FIG. 6 is a view similar to FIG. 5 but showing another form of receiver; and,

FIGS. 7 and 8 are illustrations of two nozzles for use with the cleaning apparatus of the present invention.

DETAILED DESCRIPTION OF THE EMBODIMENTS

Referring now more particularly to the drawings and to those embodiments of the invention here chosen by way of illustration, FIG. 1 shows the general system embodying the present invention. It will be recognized that FIG. 1 is substantially the same as FIG. 1 in the above identified co-pending application. The earlier filed co-pending application sets forth the structure and operation in detail, and the disclosure in that application is incorporated herein by reference. The details will therefore not be repeated except as needed for an understanding of the present additions and modifications.

FIG. 1 generally discloses a cooling tower 10 having a basin with sludge and the like 11 below the water line within the basin. The cleaning apparatus of the present invention is generally designated at 12 and includes a vertical pipe 14 extending down from a manifold 15. The manifold 15 has connected thereto a hose 16 which is connected through a valve 18 to the cleaning tool 19.

The lower end of the vertical pipe 14 is formed into a trap 20, the trap 20 then leading through a valve 21 to a filter 22.

It has been found that the sludge in cooling towers may harbor disease-causing organisms. Because of this fact, a person intimately contacting the refuse may be in danger of contracting such disease. It will be understood that the basin 10 conventionally contains a sufficient quantity of a biocide that the water itself cannot harbor such organisms; however, the sludge in the tower basin is sufficiently cohesive that the biocide-containing water cannot treat the sludge. Further, because of the efficient technique of the present invention in removing the sludge, the sludge may not be adequately contacted by water even during removal to remove the hazard of the dangerous organisms.

With the above in mind, the present invention may optionally include biocide injecting means generally designated at 24. The injection means comprises a tank or other source of a biocide designated at 25. The material is removed from the tank 25 by a pump 26, the pump 26 being preferably a metering pump. The pump 26 delivers material through a check valve 28 to a point in the system just before the filter 22.

While any readily available biocide may be utilized with the present system, it will be understood that ordinary bleach, sodium hypochlorite, is very effective since it is a source of free chlorine. Also, the biocide can be injected just before the filter 22, and the turbulence through the filter screens and the filter bag will sufficiently mix the biocide with the sludge and other material to provide adequate treatment of all the material. The waste water and the collected sludge will then be reasonably safe for handling and disposal.

It will be remembered that, in operation of the system of the present invention, one may wish to close the valve 18 and temporarily remove the cleaning tool 19 from below the water. Since the system utilizes a siphon action, entry of air into the system can break the siphon and require the start-up procedure again. In the earlier filed copending application it was mentioned that the valve 18 can be closed, and the wet filter bag will collapse and act as a flap valve. It has further been discovered that the trap 20 is a very simple and effective means for preventing entry of air into the system, and use of the trap 20 does not require any additional manual operation.

While a specific rigid member or the like may be used to form the trap 20, it will also be seen that the flexible hose forming the vertical pipe 14 can be allowed to drape into the form of a trap so that no additional pieces are required.

Looking next at FIG. 2 of the drawings, it will be noted that a plurality of cooling towers 10a and 10b is shown, each tower having a valve 30 adjacent thereto, the valves 30 being equivalent to the valve 18 in the system of FIG. 1. A vertical pipe 31, then, leads down to a pipe 32. The pipe 32 contains a valve 34 which is equivalent to the valve 21 in FIG. 1. From the valve 34, a pipe 35 leads into a trap 36, then to a filter 38. If the biocide injection is to be used in the embodiment of FIG. 2, it would preferably be connected just before the filter 38.

The operation of the embodiment of FIG. 2 is the same as was discussed in the earlier, copending application, except for the trap 36. The only difference is therefore that the trap 36 will provide a reasonably sure means to prevent entry of air into the system when all the valves 30 are closed with consequent temporary cessation of the siphon action. It is believed that the system will be easily understood without further discussion.

Looking next at FIG. 3 of the drawings, it will be noted that this is substantially the same system as is shown in FIG. 1 of the drawings, and the parts carry the same reference numerals. In this figure it will be noted that the filtering apparatus generally designated at 22 is within a container 40, the container 40 being provided with wheels 41 and 42. This structure, fully described in the parent application, places the connection for the pipe 14 above the level 44 on which the apparatus rests. Because of this arrangement, the flexible hose comprising the pipe 14 can bend down, then up, to form the trap 20.

Once again, the operation will be well understood from the foregoing brief statement in conjunction with the disclosure in the parent application, the trap 20 being the only difference.

Attention is next directed to FIG. 4 of the drawings which discloses another embodiment of the present invention. The important difference in the embodiment of FIG. 4 is that the apparatus can operate below grade, contrary to the usual operation of a siphon.

In FIG. 4, the cooling tower is generally designated at 50, and the tower has a basin 51 here shown as resting on a level surface 52. It sometimes happens that the apparatus of the present invention cannot be placed on the same level 52, or slightly below as is usual. The result is that the siphon action that is required for the operation must pick up on the lower level 52 and discharge at a higher level such as the level 54.

The apparatus shown in FIG. 4 includes the cleaning tool 55 with a valve 56 at the tool 55. The valve 56 connects to a flexible hose 58 which extends upwardly to connect to the manifold 59. From the manifold 59, a larger hose 60 extends down. Thus, the hose 58, manifold 59 and larger hose 60 make up the siphon previously described and used in the present invention. It should be noted, however, that the embodiment of the invention shown in FIG. 4 may use only the hose itself rather than the separate container as the manifold 59.

The hose 60 discharges into a receiver 61, and a connecting hose 62 leads from the receiver 61, through a trap 64, to the filter apparatus 65.

Within the receiver 61, there is mounted a pump which will be discussed below. Those skilled in the art will understand that most pumps are unable to move the sludge with its contained debris. To be able to move the material with a high content of solids, a sewage pump or a trash pump may be utilized. Both are centrifugal pumps having very open vanes, typically only two vanes, in order to be able to handle the maximum amount of solids.

The discharge from the receiver is connected directly to the connector pipe 62; and, both the pipe 60 and the pipe 62 are sealed with respect to the receiver 61 so that the interior of the receiver 61 is hermetically sealed.

With the above description in mind, the operation should be understandable. The beginning of the operation is the same as with other embodiments of the invention in that water is admitted into the system to fill the down-side of the siphon. In the system of FIG. 4, one will fill the pipe 60, and the manifold 59 if used. With the nozzle of the cleaning tool 55 under the water in the basin 51, water will be allowed to flow from the pipe 60 and the pump will be operated. Material will therefore move from the tower basin, up the hose 58, and down the hose 60, and be deposited into the receiver 61. With the pump in operation, the material will be urged through the connector pipe 62 and into the filter housing 65.

The system shown in FIG. 4 of the drawings can be operated with at least two different arrangements for the receiver 61. One version is shown in FIG. 5 of the drawings, and an alternate version is shown in FIG. 6.

The less expensive embodiment of the invention is that shown in FIG. 5, and this version is preferable for that reason. It will be seen that a sewage pump 66 is mounted within the receiver 61, the pump 66 being supported a short distance above the bottom of the receiver 61. The inlet hose 60 extends into the receiver 61 just sufficiently to allow the material to flow from the hose 60 into the receiver 61. The connector hose 62, then, is connected directly to the discharge of the pump 66 for removing materials from the receiver 61.

Those skilled in the art will realize that a sewage pump is typically low power, perhaps around one-half horsepower, or less than 400 watts. The sewage pump is not capable of suction-lift of material, but simply pushes material from the discharge. As a result it will be seen that the sludge is fed to the pump 66 by gravity, and the pump 66 then urges the sludge out of the receiver through the connector hose 62.

Though a sewage pump is not designed to lift material through suction, it will be obvious that there is some small amount of suction at the intake side of the pump. This small amount of suction will be reflected through the pipe 60 and will effectively increase the siphon action. It is therefore the combination of the siphon that has previously been discussed, and the additional lowering of the pressure by the pump 66, that allows the siphon of the present invention to operate below grade.

It will be understood that the sewage pump 66 can handle a large quantity of solids because of its open vane construction. Nevertheless, very large and heavy objects such as large rocks, large pieces of metal and the like will cause some damage to the pump. Further, the pump can be clogged by, for example, large sheets of material such as plastic sheeting frequently used in contruction. To prevent all these problems, the pump 66 is supported somewhat above the bottom of the receiver 61, thereby providing a settling action. Very heavy objects, once on the bottom, will not rise and go into the pump 66.

In combination with the settling area, the pump 66 is enclosed by a wire mesh surround 68. Since the pump 66 is designed to handle solids, and will pump the majority of debris found in cooling tower basins, the mesh should be quite large, to exclude only exceptionally large debris and to exclude sheet material. A mesh of $1\frac{1}{4}$ inches has been used successfully, though other mesh sizes may be used.

Turning now to FIG. 6 of the drawings it will be seen that the receiver 61 has the pipe 60 entering the receiver 61, and extending nearly to the bottom. The exit 62 from the receiver is just at the top, requiring that the receiver be filled to sustain flow.

The mesh surround within the receiver 61, in this embodiment, is arranged to receive material immediately from the pipe 60. Again the mesh surround 69 is an open mesh to stop only exceptionally large solids and sheet material.

The connector pipe 62 leads to the intake side of a pump known as a "trash pump". This pump is capable of considerable suction lift, though it is still an open vane, centrifugal pump. Again, the bottom of the receiver 61 acts as a settling area, and the mesh surround 69 receives sheet material and the like to protect the pump 70 from damage or clogging.

While the trash pump 70 is capable of suction lift, even of relatively heavy material, it will be understood that the present invention still utilizes the siphon as previously described for the primary material moving force. The trash pump 70 pumps well when fed with liquid, but would require a lot of time and energy to bring the material initially to the pump. Thus, the siphon comprising hoses 58 and 60, and the manifold 59 when used, is primed as previously described. Operation of the pump 70 will of course lower the pressure within the receiver 61, hence in the pipe 60, to continue, and to enhance, operation of the siphon allowing the siphon to lift material from below grade.

Turning next to FIGS. 7 and 8 of the drawings, two specific nozzles for use with the present invention are shown. The feature common to both nozzles is that inlets are provided on all sides of the nozzles. It will be obvious from the above description that the nozzle must be moved through the sludge in the tower basin. Such motion will necessarily cause some agitation and tend to suspend some particles in the water. The preferred nozzle has suction in all directions to take in adjacent water with the contaminants.

FIG. 7 is a cross-sectional view of a nozzle of the type that may be used in the open floor of a basin. It will be seen that the body 75 has a connection 76 for the cleaning tool 19, and a transverse slit 78 will take in the bulk of the sludge from the bottom of the basin.

As the nozzle moves through the sludge, suction will be provided at the front by at least one hole 79 and at the rear by at least one hole 80. Similarly, the sides are provided with holes such as the hole 81 and the top has at least one hole 82. Realizing that rather high suction is being applied to the body 75, it will be understood that contaminants in the area of the nozzle will be pulled into the nozzle.

FIG. 8 illustrates a nozzle 85 which is tubular, the cleaning tool 19 being connected at the end 86, here shown as broken away. The nozzle shown in FIG. 8 is sufficiently elongated that it can reach into interstices and other generally inaccessible places in a tower basin. The open end 88 of the nozzle 85 will primarily receive the sludge to be removed while the plurality of holes 89 generally cover the nozzle 85 to provide suction in all directions. Operation is then substantially the same as the nozzle shown in FIG. 7, and no further description is thought to be necessary.

From the foregoing description it will be understood that the present invention provides an improved tower basin cleaning system. When, during a cleaning operation, the nozzle of the cleaning tool 19 needs to be removed from the water, the operator can simply close the valve 18 and lift the tool from the water. The trap 20 will contain a quantity of liquid to prevent the passage of air into the system so that, when the valve 18 is opened, the siphon action will immediately resume.

When it is felt that the sludge in the tower basin may be contaminated, or any time the operator prefers the additional safety margin, the biocide injector 24 can be used to kill harmful organisms.

The nozzles having a plurality of secondary inlets provide good removal of the sludge, which is the primary problem, and further remove water having contaminants temporarily entrained therein. Thus, the nozzles herein disclosed provide improved cleaning of the system.

Finally, though the majority of tower basins are above grade so that a simple siphon action can be used to operate the system, a few tower basins are either literally below ground level, or are so situated that the discharge end of the pipe 14 cannot be placed lower than the intake end of the tool 19. For these tower basins, the receiver 61 can be used. Operation of the open vane pump 66 or 70 creates enough suction that, in conjunction with the siphon of the present invention, the sludge can actually be elevated and discharged on a higher level.

It will of course be realized by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

We claim:

1. A cooling tower basin cleaning apparatus, for cleaning debris-containing sludge from below water in a tower basin, comprising a cleaning tool having a nozzle thereon, and siphon means for creating continuous suction on said cleaning tool and for carrying said sludge from said tower basin, said siphon means including a first pipe means connected to said cleaning tool and extending upwardly to a point above the level of water in said tower basin, a reservoir disposed at said point above the level of water, said reservoir having said first pipe means fixed thereto and in communication with said reservoir, a second pipe means in communication with said first pipe means through said reservoir above the level of water in said tower basin, said second pipe means extending downwardly and having a lower end, filter means connected to and in communication with said lower end of said second pipe means, a trap defined in said second pipe means before said filter means, a first valve for selectively closing said second pipe means at said lower end, and water supply means for filling said second pipe means and said reservoir with water while said first valve is closed, the arrangement being such that said second pipe means can be filled with water with said first valve closed, and said first valve can be opened to establish a siphon action to provide suction on said cleaning tool.

2. A cooling tower basin cleaning apparatus as claimed in claim 1, said nozzle including a body in communication with said cleaning tool, said body defining a first opening for receiving said sludge, said body further defining a plurality of secondary openings in said body for drawing in water adjacent to said nozzle.

3. A cooling tower basin cleaning apparatus as claimed in claim 2, said body being substantially tubular, said first opening being at one end of the tubular body, said secondary openings being distributed along the wall of said body.

4. A method for cleaning the basin of a cooling tower having debris-containing sludge on the bottom of said basin while cooling water is flowing into and out of said basin, said method including the steps of placing a cleaning tool in said tower basin with the end of said cleaning tool carrying a nozzle beneath the level of water in said basin, providing continuous suction on said cleaning tool, and moving said cleaning tool with said nozzle about said basin to allow said suction to pick up said sludge and some water, and continually replenishing the water in the basin, said step of providing continuous suction on said cleaning tool including the steps of filling a first pipe means with water to a level above the level of water in said basin, connecting a second pipe means from said cleaning tool to said first pipe means at said level above said level of water in said basin, connecting a receiver to the lower end of said first pipe means, allowing said water to flow from said first pipe means to establish a siphon, and using pump means to remove material from said receiver and to lower the pressure within said receiver and within said first pipe means to enhance said siphon so that said siphon will operate with said receiver above the level of water in said basin.

5. A method as claimed in claim 4, and including the step of discharging material from said receiver through a trap for preventing air from entering said first pipe means on temporary cessation of the siphon operation.

6. A method as claimed in claim 5, and including the steps of allowing heavy material to settle to the bottom of said receiver, and using said pump means for removing material above said bottom.

7. A method as claimed in claim 6, and further including the step of straining said material to prevent sheet-like material from entering said pump means.

8. A method as claimed in claim 4, and further including the steps of providing suction in a plurality of directions with respect to said nozzle for picking up sludge entrained in said water adjacent to said nozzle during said step of moving said tool about said basin.

* * * * *